(12) United States Patent
Takano

(10) Patent No.: US 8,678,055 B2
(45) Date of Patent: Mar. 25, 2014

(54) PNEUMATIC TIRE

(75) Inventor: Hirokazu Takano, Hyogo (JP)

(73) Assignee: Sumitomo Rubber Industries, Ltd., Kobe-shi, Hyogo (JP)

( * ) Notice: Subject to any disclaimer, the term of this patent is extended or adjusted under 35 U.S.C. 154(b) by 354 days.

(21) Appl. No.: 13/179,152

(22) Filed: Jul. 8, 2011

(65) Prior Publication Data

US 2012/0006460 A1 Jan. 12, 2012

(30) Foreign Application Priority Data

Jul. 9, 2010 (JP) .................................. 2010-157066

(51) Int. Cl.
*B60C 13/02* (2006.01)

(52) U.S. Cl.
USPC ...................................... 152/523; 152/209.16

(58) Field of Classification Search
CPC ................................. B60C 13/00; B60C 13/02
USPC ............................................. 152/209.16, 523
See application file for complete search history.

(56) References Cited

U.S. PATENT DOCUMENTS

| | | | | |
|---|---|---|---|---|
| 2,800,098 | A * | 7/1957 | Crosby, Jr .................... | 116/34 R |
| 3,568,747 | A * | 3/1971 | Fletcher et al. ............... | 152/154 |
| 4,134,357 | A * | 1/1979 | Chesley ........................ | 152/523 |
| 2004/0123929 | A1 * | 7/2004 | Han ............................... | 152/523 |
| 2007/0102088 | A1 * | 5/2007 | Hayashi et al. ............... | 152/532 |

FOREIGN PATENT DOCUMENTS

| | | | |
|---|---|---|---|
| JP | 11-151190 | * | 6/1999 |
| JP | 2003-112505 A | | 4/2003 |
| JP | 2010-188975 | * | 9/2010 |

OTHER PUBLICATIONS

English machine translation of JP11-151190, dated Jun. 1999.*

* cited by examiner

*Primary Examiner* — Justin Fischer
*Assistant Examiner* — Robert Dye
(74) *Attorney, Agent, or Firm* — Birch, Stewart, Kolasch & Birch, LLP

(57) ABSTRACT

A pneumatic tire comprises a plurality of protect ribs extending at an angle $\alpha$ of 0 to 20° with respect to a tire radial direction line and provided on outer surfaces S of sidewall portions at distances from each other in a circumferential direction of a tire. Each of the protect ribs includes a maximum height portion whose height from the outer surface S is maximum. A vertical cross section shape which passes through the maximum height portion is of substantially triangular shape. This s substantially triangular shape includes an outer end-side inclined portion having the height which is gradually reduced from the maximum height portion to a radial outer end Ra, and an inner end-side inclined portion having the height which is gradually reduced from the maximum height portion to a radial inner end Rb. A distance La between the maximum height portion and the radial outer end Ra in the length direction is in a range of 0.1 to 0.3 times of a distance LR in the length direction between the radial outer end Ra and the inner end Rb of the protect rib, and a tire radial distance Ha between the radial outer end Ra of the protect rib and a bead base line is in a range of 0.6 to 0.8 times of a tire cross section height HT.

7 Claims, 9 Drawing Sheets

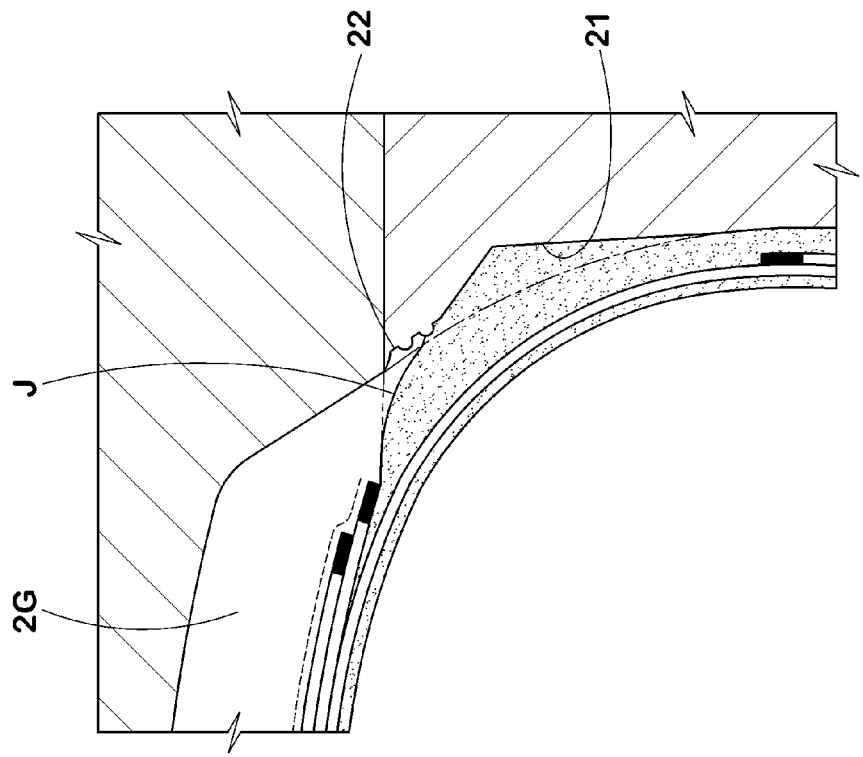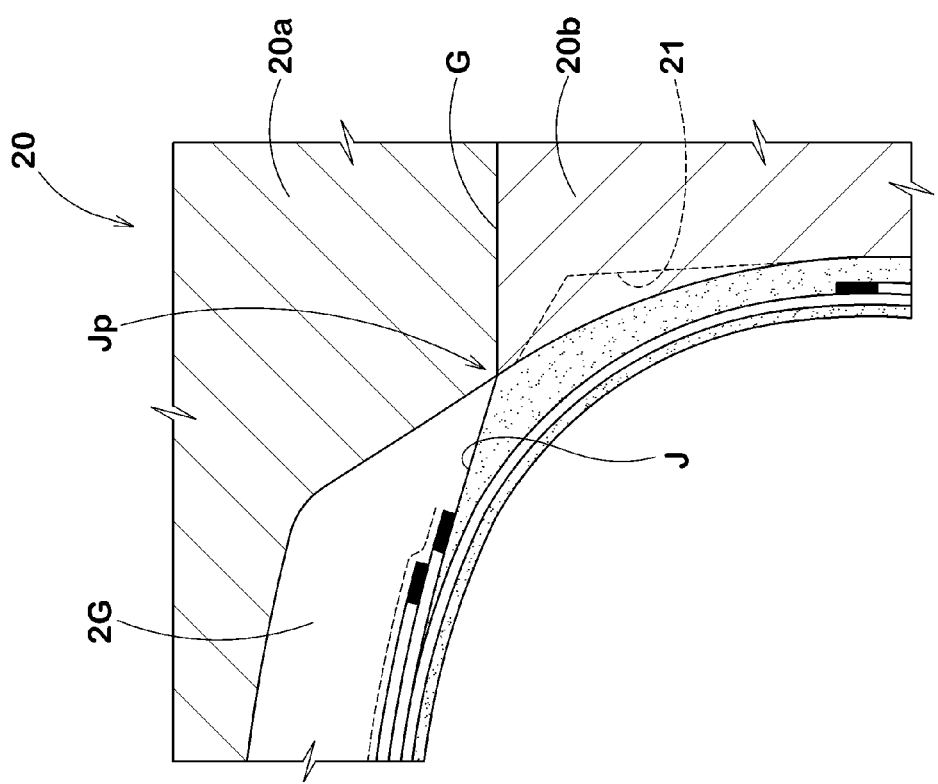

Prior Art

PNEUMATIC TIRE

TECHNICAL FIELD

The present invention relates to a pneumatic tire having enhanced cut resistance.

BACKGROUND ART

A pneumatic tire used for a four-wheel drive vehicle and a sport utility vehicle (suv) is frequently used for running on an uneven terrain. Hence, a sidewall portion of the tire collides against a stone on a road surface during running and a cut is generated in the sidewall portion causing damage to the tire in some cases.

To avoid such a problem, as shown in FIG. 9 for example, it is conventionally proposed to provide a sidewall portion a with a side protector b bulging from an outer surface of the sidewall portion a to enhance the cut resistance (see patent document 1 for example).
[PTL 1] Japanese Patent Application Publication No. 2003-112505

DISCLOSURE OF THE INVENTION

Problem to be Solved by the Invention

However, since the conventional side protector b has an annular shape which continuously extends in a circumferential direction of the tire as shown in FIG. 9, a volume of the tire is substantial, and a tire mass is increased. Further, there are problems that vertical rigidity of the tire is unnecessarily enhanced and riding comfort is deteriorated.

Hence, it is an object of the present invention to provide a pneumatic tire capable of securing necessary cut resistance, suppressing increase of a tire mass and vertical rigidity of the tire to the minimum levels, reducing a wire weight, and enhancing riding comfort.

Means to Solve the Invention

In order to achieve the object mentioned above, the present invention as claimed in claim 1 provides a pneumatic tire comprising a tread portion, a pair of sidewall portions extending inward in a radial direction of the tire from both ends of the tread portion in an axial direction of the tire, and bead portions disposed on tire-radial inner ends of the sidewall portions, wherein a plurality of protect ribs extending from a side of the tread portion in a length direction at an angle α of 0 to 20° with respect to a tire radial direction line and being disposed at distances from one another in a circumferential direction of the tire, are provided on an upper sidewall region which is in an outer surface S of each of the sidewall portions and outward of a tire maximum width point in the radial direction of the tire, each of the protect ribs includes a maximum height portion whose height from the outer surface S is maximum, a vertical cross section shape of the protect rib which is parallel to the length direction passing through the maximum height portion is of substantially triangular shape, the substantially triangular shape includes an outer end-side inclined portion having the height which is gradually reduced from the maximum height portion to a radial outer end Ra of the protect rib, and an inner end-side inclined portion having the height which is gradually reduced from the maximum height portion to a radial inner end Rb of the protect rib, and a distance La between the maximum height portion and the radial outer end Ra in the length direction is in a range of 0.1 to 0.3 times of a distance LR in the length direction between the radial outer end Ra and the inner end Rb of the protect rib, and a tire radial distance Ha between the radial outer end Ra of the protect rib and a bead base line is in a range of 0.6 to 0.8 times of a tire cross section height HT.

In this specification, unless otherwise specified, sizes of the various portions of the tire are values specified in a normal internal pressure-charged state where the tire is mounted around a normal rim and normal internal pressure is charged into the tire. The "normal rim" is a rim determined for each tire by a specification standard including a specification on which the tire is based, and is a standard rim specified in JATMA, a "Design Rim" in TRA, and a "Measuring Rim" in ETRTO. Further, the "normal internal pressure" means an air pressure determined for each tire by the specification, and is a maximum air pressure in JATMA, a maximum value described in a Table "TIRE LOAD LIMITS AT VARIOUS COLD INFLATION PRESSURES" in TRA, and "INFLATION PRESSURE" in ETRTO. When the tire is for a passenger vehicle, the normal internal pressure is 180 kPa.

Effects of the Invention

According to the present invention, as described above, the side protector is formed by the plurality of protect ribs provided at distances from one another in the circumferential direction of the tire, and the protect ribs are formed only in the upper sidewall region which requires cut resistance. According to this configuration, it is possible to suppress the increase in rubber volume, to reduce the tire weight, to suppress the vertical rigidity of the tire, and to enhance the riding comfort.

Further, a vertical cross section of the protect rib is of the substantially triangle shape having the maximum height portion, the position of the radial outer end and the maximum height portion of the protect rib are specified, and the maximum height portion having the highest reinforcing effect is located at the position where a cut is prone to be generated. Therefore, it is possible to secure necessary cut resistance with smaller rubber volume. The protect rib has the substantially triangular vertical cross section, and the rigidity of the protect rib is made smaller toward the tire maximum width point where the tire is prone to deform. Hence, it is possible to suppress the influence on the vertical rigidity of the tire to the minimum, and to further enhance the riding comfort.

BRIEF DESCRIPTION OF DRAWINGS

FIGS. 8(A) and 8(B) are sectional views for explaining operation effects obtained by buffer ribs.

BEST MODE FOR CARRYING OUT THE INVENTION

Figure 1:
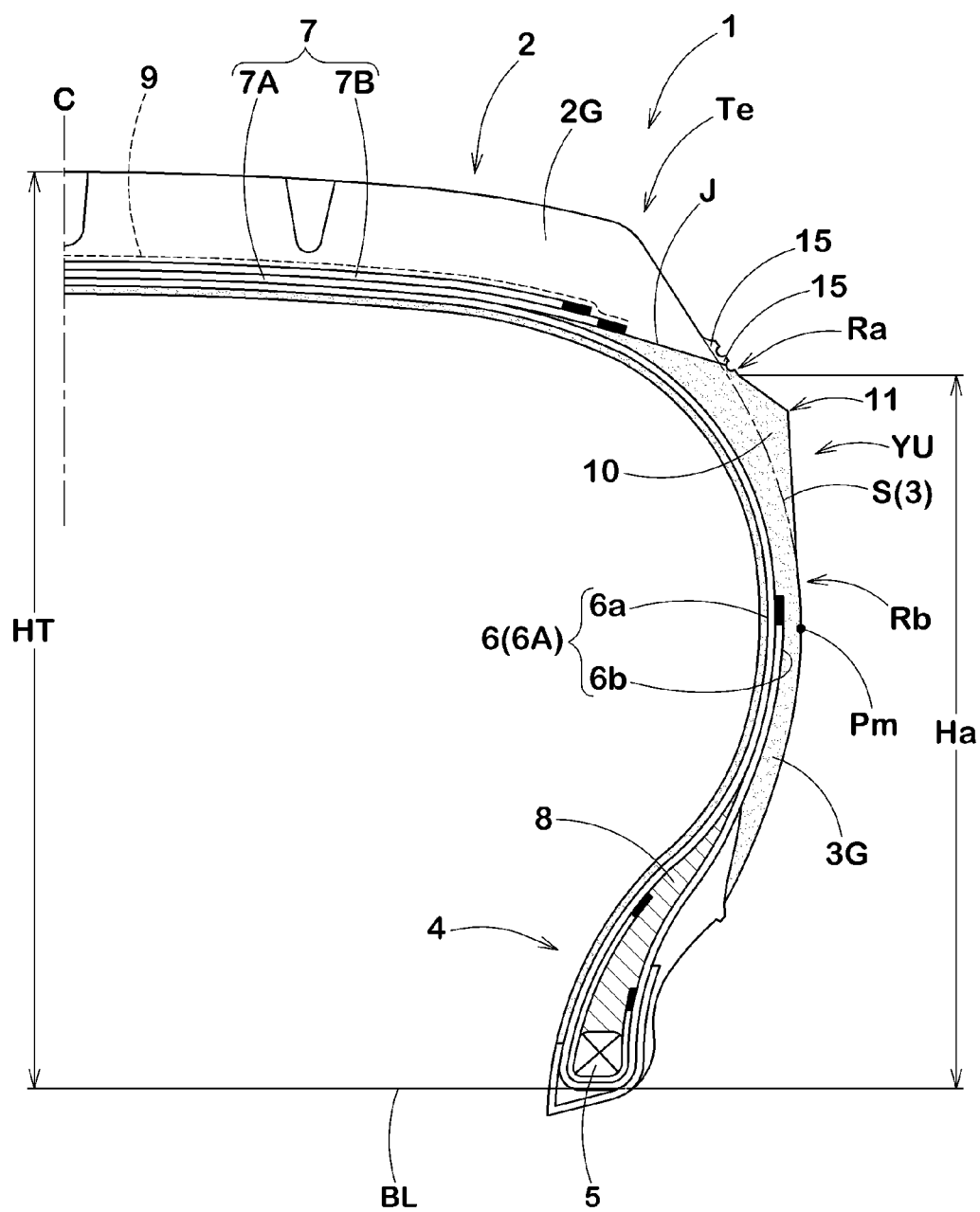
FIG. 1 is a sectional view showing an embodiment of a pneumatic tire of the present invention.

An embodiment of the present invention will be described in detail. FIG. 1 is a sectional view showing a normal internal pressure-charged state of a pneumatic tire 1 of the invention. In the drawing, the pneumatic tire 1 includes a tread portion 2, a pair of sidewall portions 3 extending radially inward of the tire from tire-axial both ends, and bead portions 4 disposed at tire-radial inner ends of the sidewall portions 3.

The tire 1 includes a cord reinforcing layer. The cord reinforcing layer includes a carcass 6 extending from the tread portion 2 to bead cores 5 of the bead portions 4 through the sidewall portions 3, and a belt layer 7 disposed radially outside of the carcasses 6 and inward of the tread portion 2.

The carcass 6 is formed from one or more (one, in this embodiment) carcass ply 6A in which carcass cords are arranged at an angle, for example, of 75° to 90° with respect to the circumferential direction of the tire. The carcass ply 6A includes a toroidal ply body 6a extending between the bead cores 5 and 5, and ply folded-back portions 6b which are folded back from an inner side to an outer side in the axial direction of the tire around the bead cores 5, at both ends of the ply body 6a. Bead-reinforcing bead apex rubbers 8 are disposed between the ply body 6a and each of the ply folded-back portions 6b. Each of the bead apex rubbers 8 extends radially outward of the tire from the bead core 5 in a tapered form.

The belt layer 7 is formed from two or more (two, in this embodiment) belt plies 7A and 7B in which belt cords are arranged at an angle of 10 to 40° with respect to a circumferential direction of the tire. Since the belt cords in the belt layer 7 intersect with each other between the plies, the belt rigidity is enhanced, and substantially an entire width of the tread portion 2 is strongly reinforced with effects of compressed hoop.

To enhance the high speed endurance, a band layer 9 formed by spirally winding a band cord in the circumferential direction of the tire can be provided on an outer side of the belt layer 7 in the radial direction. As the band layer 9, it is possible to appropriately use a pair of left and right edge band plies which cover only tire axial outer ends of the belt layer 7, and a full band ply which covers substantially an entire width of the belt layer 7. In this embodiment, the band layer 9 is formed from one full band ply. As the carcass cord, the belt cord, and the band cord, it is possible to appropriately employ various kinds of known tire cords like in the conventional technique.

Figure 2:
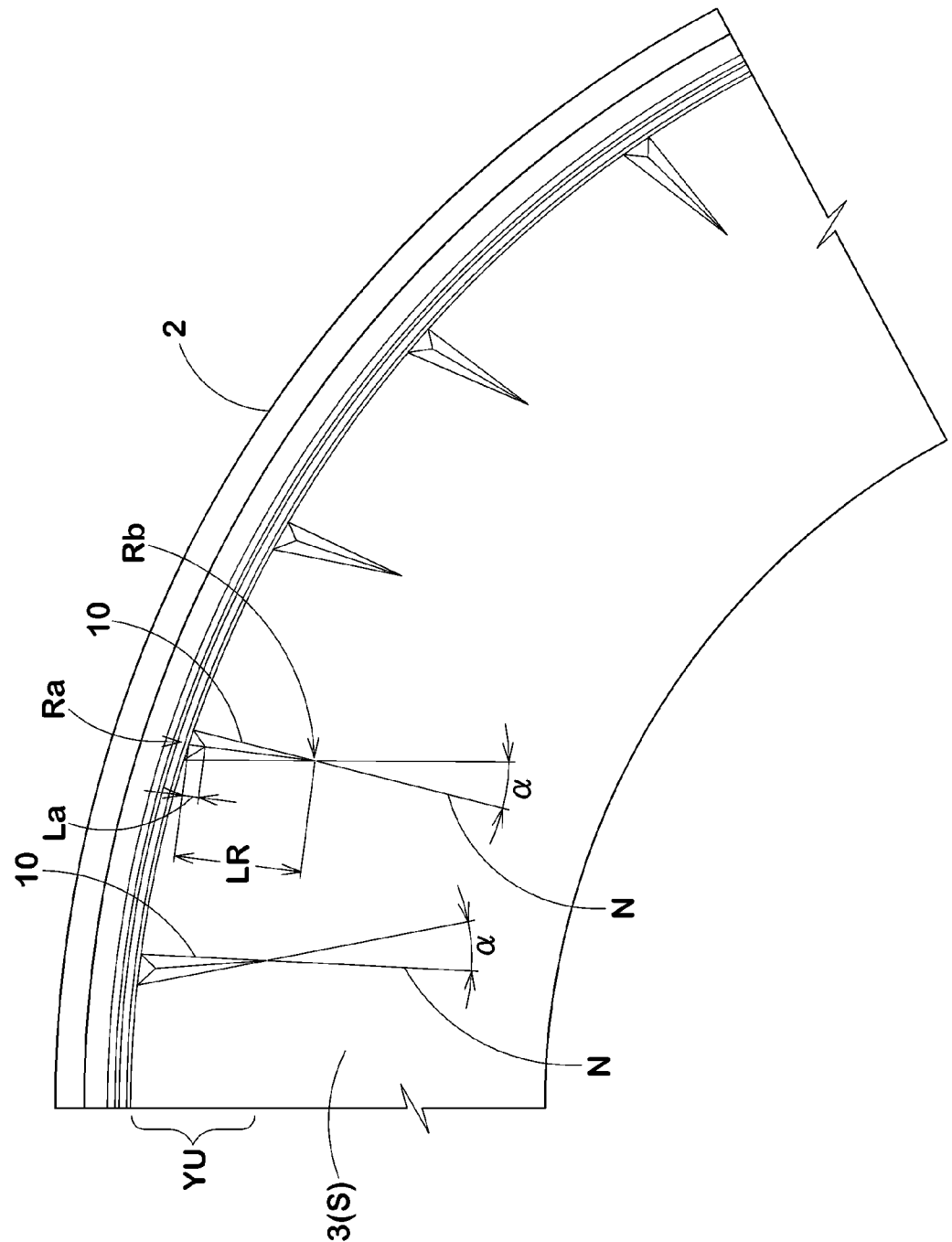
FIG. 2 is a partial side view of the tire showing a layout of protect ribs.

As shown in FIG. 2, a plurality of projecting protect ribs 10 are provided on an outer surface S of the sidewall portion 3 at distances from one another in the circumferential direction of the tire in an upper sidewall region YU closer to an outer side in the radial direction of the tire than a tire maximum width point Pm. The outer surface S includes a tire outer side surface up to a tread ground-contact end Te.

Each of the protect ribs 10 extends from a radial outer end Ra to a radial inner end Rb in a length direction at an angle α of 0 to 20° with respect to a tire radial direction line N. A tire radial distance Ha of the radial outer end Ra (shown in FIG. 1) from a bead base line BL is set within a range of 0.6 to 0.8 times of a tire cross section height HT.

Figure 3:
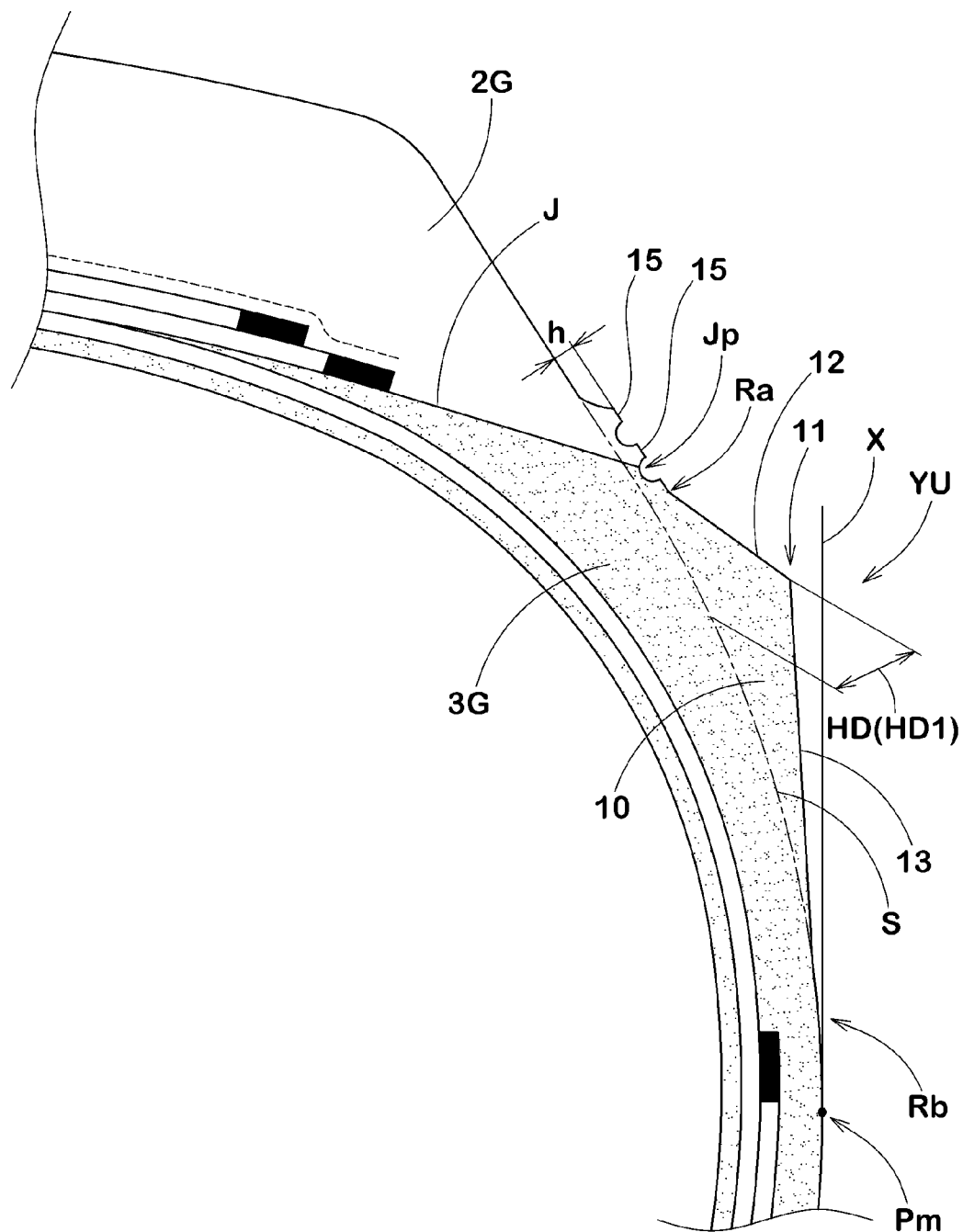
FIG. 3 is a partial sectional view of the tire showing the protect ribs.
Figure 4A:
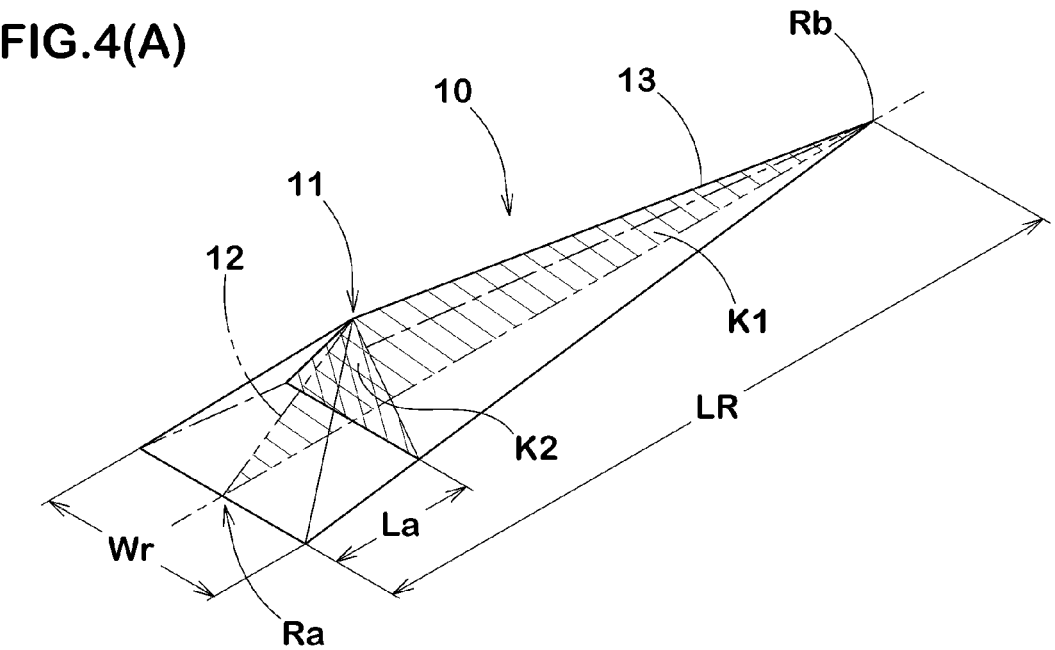
FIGS. 4(A) to 4(C) are a perspective view of the protect rib, a vertical sectional view parallel to a length direction of the protect rib, and a transverse sectional view perpendicular to the length direction.
Figure 4B:
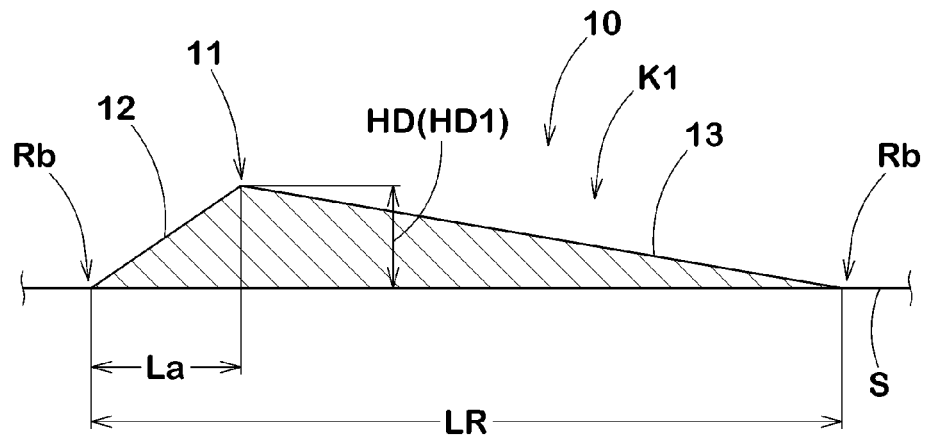

As shown in FIGS. 3 and 4, the protect rib 10 includes a maximum height portion 11 whose height HD from the outer surface S is the maximum. A vertical cross section shape K1 (shown in FIGS. 4(A) and (B)) which is parallel to the length direction passing through the maximum height portion 11 has a substantial triangular shape. This substantial triangular shape includes an outer end-side inclined portion 12 having the height HD which is gradually reduced from the maximum height portion 11 to the radial outer end Ra of the protect rib 10, and an inner end-side inclined portion 13 having the height HD which is gradually reduced from the maximum height portion 11 to the radial inner end Rb of the protect rib 10. A distance La between the maximum height portion 11 and the radial outer end Ra in the length direction is in a range of 0.1 to 0.3 times of a distance LR (this is called rib length LR in some cases) in the length direction between the radial outer end Ra and the inner end Rb of the protect rib 10.

The plurality of protect ribs 10 are provided at distances from one another in the circumferential direction of the tire only in the upper sidewall region YU where cut resistance is required. Hence, it is possible to suppress the increase in rubber volume, to reduce the tire weight, to suppress the increase in vertical rigidity of the tire, and to enhance the riding comfort. Further, the vertical cross section shape K1 of the protect rib 10 is formed into the substantial triangular shape having the maximum height portion 11, the position of the radial outer end Ra of the protect rib 10 and the position of the maximum height portion 11 are specified by the distances La and Ha, and the maximum height portion 11 having the highest reinforcing effect is located at the position where a cut is prone to be generated. Therefore, it is possible to secure necessary cut resistance with smaller rubber volume. The vertical cross section shape K1 is formed into the substantial triangular shape, and the rigidity of the protect rib 10 is reduced toward the tire maximum width point Pm which is prone to deform. Hence, it is possible to suppress the influence on the vertical rigidity of the tire to the minimum, and to further enhance the riding comfort.

If the distance Ha becomes shorter than 0.6 times of the tire cross section height HT, it becomes impossible to protect a position where a cut is most prone to be generated. If the distance Ha exceeds 0.8 times on the other hand, a probability that the protect ribs 10 easily come into contact with a road surface even if the road is not bad is increased and the running performance is deteriorated. If the distance La becomes shorter than 0.1 times of the rib length LR, a large thrust force in the radial direction is applied when the protect ribs 10 come into contact with a stone on a road surface, and there is a tendency that the protect rib 10 is damaged, for example, rubber of the protect rib 10 becomes chipped. If the distance La exceeds 0.3 times of the rib length LR on the other hand, since the maximum height portion 11 having the highest reinforcing effect comes out from the position where the cut is prone to be generated, the reinforcing effect becomes insufficient. From this viewpoint, it is preferable that a lower limit of the distance Ha is not less than 0.65 times of the tire cross section height HT, and an upper limit of the distance Ha is not more than 0.75 times of the tire cross section height HT. A lower limit of the distance La is preferably not less than 0.15 times of the rib length LR, and an upper limit of the distance La is preferably not more than 0.25 times of the rib length LR.

The angle α is 0° or more, but if the angle α is less than 5°, a force in the circumferential direction which is applied to the protect rib 10 when the protect rib 10 comes into contact with a stone on a road surface is increased, and there is a tendency that the protect rib 10 is damaged, for example, rubber of the protect rib 10 becomes chipped. Hence, it is preferable that the angle α is equal to or more than 5°. If the angle α exceeds 20° and if a region range which protects the sidewall portion 3 remains the same, since the rib length LR relatively becomes long and this is disadvantageous for weight-reduction. Hence, it is further preferable that the angle α is equal to or less than 10°.

When protect ribs 10 come into contact with a stone on a road surface, generally, the protect ribs 10 come into contact in the order from the side of the radial outer end Ra. Hence, it is necessary that the protect ribs 10 has higher strength at the side closer to the radial outer end Ra. Hence, in this embodiment, a rib width Wr in a direction perpendicular to the length direction is gradually reduced toward the radial inner end Rb from the radial outer end Ra. Especially in this embodiment, the rib width Wr at the radial inner end Rb is set to zero.

Figure 4C:
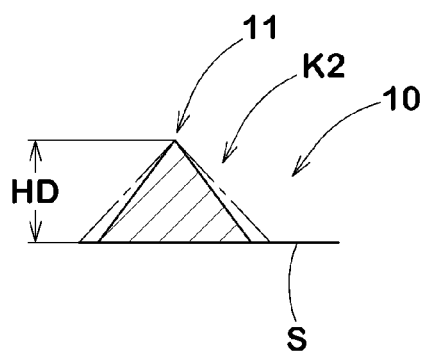
Figure 5:
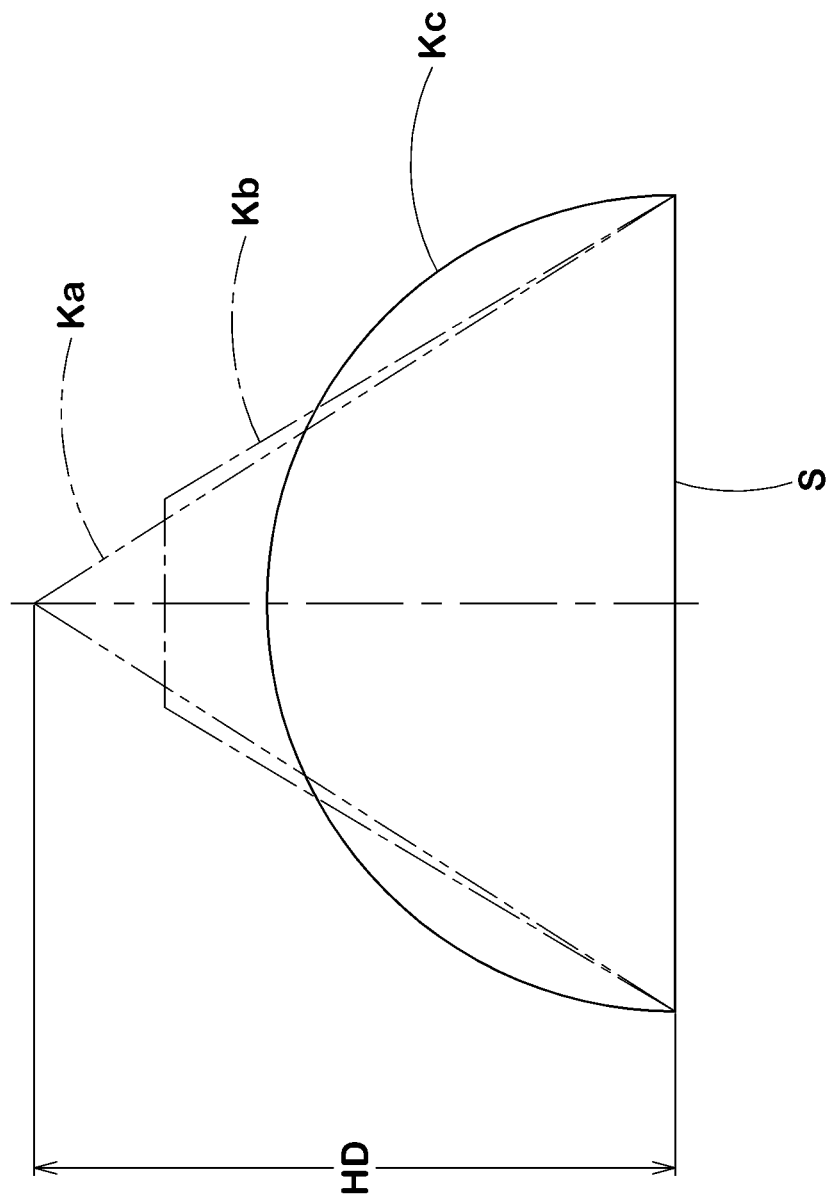
FIG. 5 is a sectional view for explaining a transverse cross sectional shape of the protect rib.
Figure 6A:
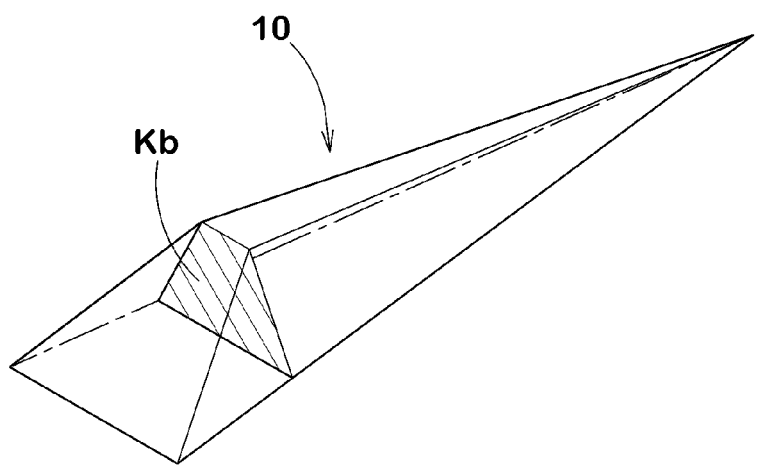
FIGS. 6(A) to 6(C) are perspective views showing other embodiments of the protect rib.
Figure 6B:
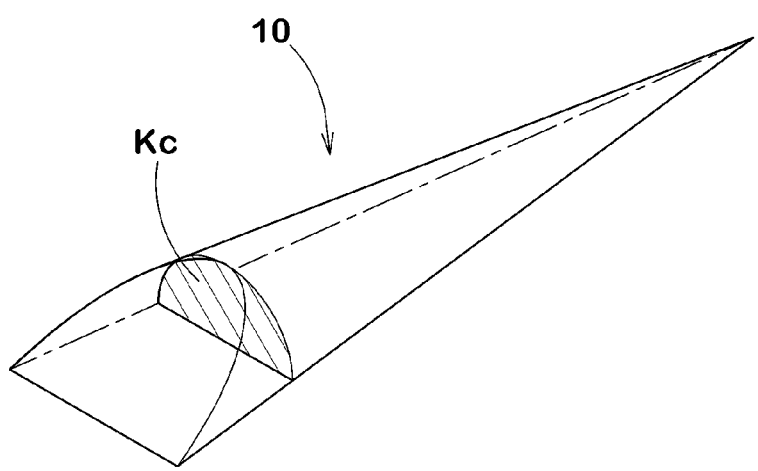

As shown in FIGS. 4(A) and 4(C), a width of a transverse cross section of the protect rib 10 of this embodiment which is perpendicular to the length direction is gradually reduced as being separated from the outer surface S. That is, a width of a transverse cross section shape K2 of the protect rib 10 is the maximum on the outer surface S, and the width of the cross section is gradually increased as the height HD from the outer surface S is increased. As shown in FIG. 5, examples of the cross section shape are a triangular shape Ka, a trapezoidal shape Kb, and a semicircular shape Kc. Among them, in the triangular shape Ka and the trapezoidal shape Kb, if the cross sectional area remains the same, the height HD from the outer surface S can be increased as compared with the semicircular shape Kc, and it is possible to preferably employ the triangular shape Ka and the trapezoidal shape Kb to enhance the cut resistance. Especially, the triangular shape Ka is preferable because the height HD can be increased more. An example of the protect rib 10 having the triangular (Ka) transverse cross section shape K2 is a triangular pyramid body shown in FIG. 4(A), and an example of the protect rib 10 having a trapezoidal (Kb) transverse cross section shape K2 is a truncated triangular pyramid body shown in FIG. 6(A). An example of the protect rib 10 having a semicircular (Kc) transverse cross section shape K2 is shown in FIG. 6(B).

As shown in FIG. 3, it is preferable that the protect rib 10 does not project outward of the tire beyond a radial direction line x which passes through the tire maximum width point Pm. If the protect rib 10 projects outward of the tire beyond the radial direction line x, the cut resistance is excessively enhanced, the rubber volume is unnecessarily increased, the projecting portion of the protect rib 10 is caught on a curb during running and operability of a steering wheel is deteriorated. The maximum value of the height HD of the protect rib 10, i.e., a height HD1 of the maximum height portion 11 is preferably in a range of 2.0 to 7.0 mm. If the maximum value exceeds 7.0 mm, the cut resistance is excessively enhanced, and a weight of the tire is unnecessarily increased. If the maximum value is smaller than 2.0 mm on the other hand, the enhancing effect of the cut resistance cannot be exerted sufficiently.

Figure 7:
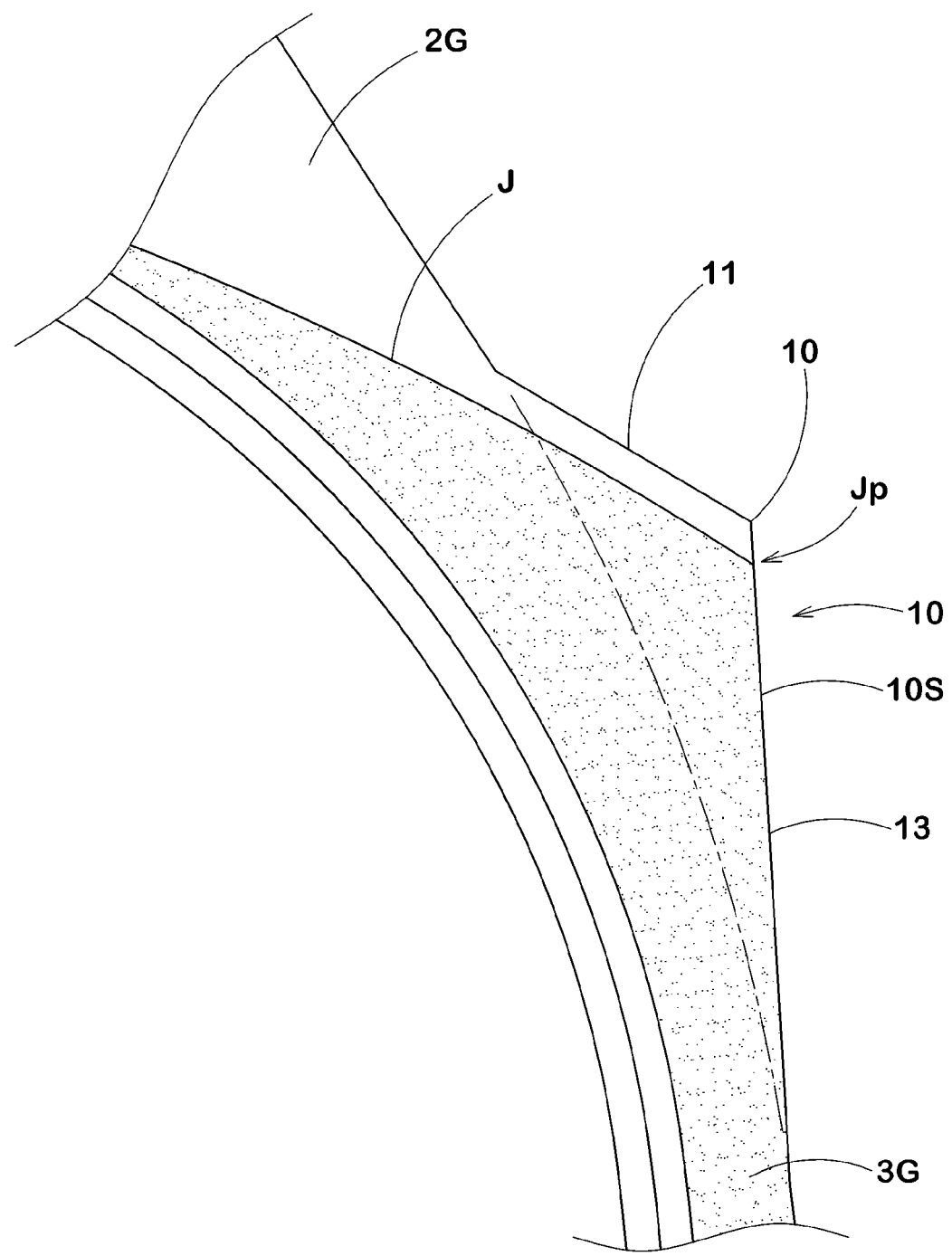
FIG. 7 is a sectional view for explaining a positional relation with respect to a critical line between a tread rubber and a sidewall rubber of the protect rib.

Next, as shown in FIG. 7, when a critical line J at which a tread rubber 2G and a sidewall rubber 3G come into contact with each other is exposed on an outer surface 10S of the protect rib 10 through the protect rib 10, there is a tendency that a crack is generated at an exposure position Jp of the critical line J and the protect rib 10 is damaged. Since the critical line J is a portion where rubbers of different materials are bonded to each other, there is a tendency that the rubbers are peeled off from each other. Distortion is intensely generated in the outer surface 10S of the protect rib 10 when the tire deforms, and when the transverse cross section shape K2 has the triangular shape Ka, the trapezoidal shape Kb, or the semicircular shape Kc and the cross section width is gradually reduced toward the outer surface 10S, especially when the transverse cross section shape K2 has the triangular shape Ka in which the outer surface 10S becomes an edge line, distortion is intensively generated. Therefore, when the critical line 3 is exposed on the outer surface 10S, a crack is prone to be generated at the exposure position Jp by the mutual effect. To avoid the crack, as shown in FIG. 3, the protect rib 10 is disposed inward of the exposure position Jp of the critical line J in the radial direction of the tire. That is, it is preferable that an outer end Ra of the protect rib 10 is located inward of the exposure position Jp in the radial direction of the tire.

Generally, when a tire is vulcanized and formed, there is a tendency that air stays at the exposure position Jp of the critical line J. Hence, as shown in FIG. 8(A), a vulcanization mold 20 is designed such that a dividing surface position G matches with the exposure position Jp, and known exhausting means such as a vent piece is provided in the dividing surface position G. When the pneumatic tire 1 of the invention is vulcanized and formed, among mold portions 20a and 20b which are adjacent to each other at the dividing surface position G, the mold portion 20b located radially inward is provided with a recess groove 21 for forming the protect rib. However, when a green tire is formed, a portion of the tread rubber 2G flows inward in the radial direction due to assembling variation in the tire or due to variation in rubber flow, the critical line J passes through the protect rib 10 and the problem of the crack is generated. Hence, in this embodiment, as shown in FIG. 3, a buffer rib 15 is provided in adjacent to the protect rib 10 on an outer side of the protect rib 10 in the radial direction. The buffer rib 15 projects at small height from the outer surface S and continuously extend in the circumferential direction of the tire. That is, as shown in FIG. 8(B), an annular groove 22 for forming the buffer rib 15 is formed in the mold portion 20b. The annular groove 22 functions as a rubber pool of the tread rubber 2G when rubber flow varies. Therefore, even when a portion of the tread rubber 2G flows toward an inner side in the radial direction due to variation in the rubber flow, the portion of the tread rubber 2G can be reserved in the annular groove 22, thereby being prevented from flowing into the recess groove 21. A projecting height h of the buffer rib 15 from the outer surface is smaller than the height HD1, and is in a range of 1 to 5 mm, and preferably in a range of 2 to 4 mm. In this embodiment, two buffer ribs 15 are provided so as to more reliably prevent the tread rubber 2G from flowing into the recess groove 21.

Figure 6C:
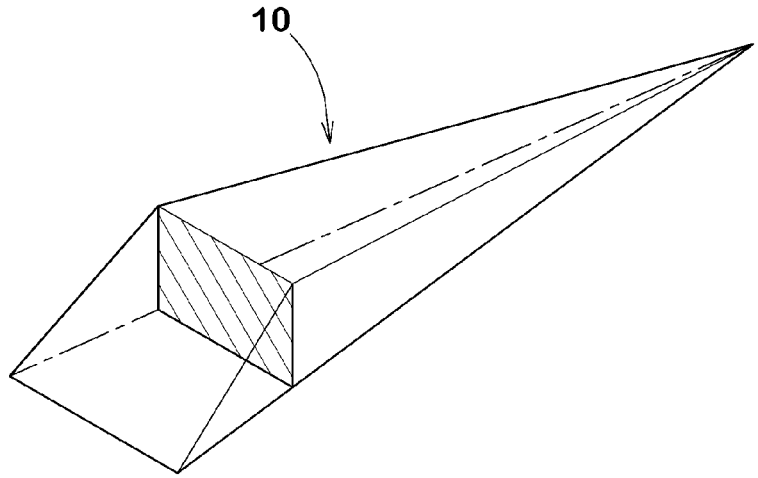

As shown in FIG. 6(C), it is possible to employ a rectangular protect rib 10 whose cross section width in the transverse cross section shape is constant in the height direction.

Although the especially preferred embodiment of the present invention has been described in detailed above, the invention is not limited to the illustrated embodiment, and the invention can variously be deformed and carried out.

EXAMPLES

Tires (tire size: LT325/65R18) for a four-wheel drive vehicle having the tire structure shown in FIG. 1 were prototyped in accordance with specification shown in Table 1, and cut resistance, riding comfort, steering stability, crack resistance, and tire weights of the tires were measured and the measured values were compared with each other. The tires have substantially the same configuration other than the protect ribs.

Figure 9:
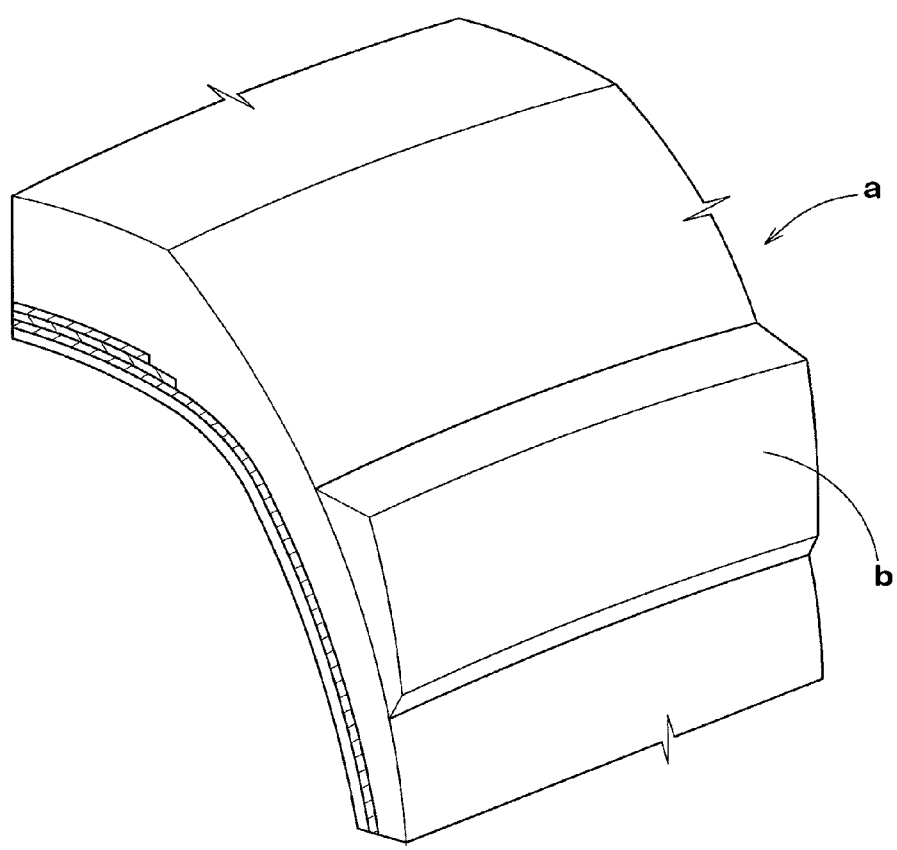
FIG. 9 is a partial perspective view of a tire for explaining a conventional side protector.

In Table 1:
Comparative example 1 uses a circumferential rib (FIG. 9) which continuously extends in the circumferential direction instead of the protect ribs;

A distance Lb means a radial distance between the radial inner end Rb of the protect rib and the tire maximum width point Pm, and − (minus) means that the radial distance extends off radially inward beyond the tire maximum width point Pm; and Rib widths Wr of the protect ribs in the radial outer end Ra are the same and are 9.7 mm, "gradually reduced" means that the rib width Wr is gradually reduced toward the inner end Rb, and "constant" means that the rib width Wr is constant in the length direction.

(1) Cut Resistance:

Prototyped tires were mounted around all of wheels of the four-wheel drive vehicle (Chevrolet Silverado 2500HD) under conditions of rim (18×9J) and an internal pressure (275 kPa), the vehicle run about 50 km on a bad road which is littered with rocks and workings and then, cuts generated in outer surfaces of sidewall portions were visually observed and the tires were evaluated in a comprehensive manner. The evaluations are indicated in the following manner:

"○": a cut is not generated or a depth of a generated cut is 0.5 mm or less;

"Δ": a depth of a generated cut is more than 0.5 mm and 2.0 mm or less;

"×": a depth of a generated cut is more than 2.0 mm.

(2) Riding Comfort, Steering Stability:

The riding comfort and the steering stability during running on the bad road were evaluated on a scale of one to ten by a driver's feeling. The greater the numerical value is, the more excellent the riding comfort and the steering stability are.

(3) Crack Resistance:

The prototyped tires were left as they were for 15 days in an atmosphere of temperature of 40° C. and ozone density of 50 PPHM under the conditions of rim (18×9J) and an internal pressure (275 kPa). Thereafter, the internal pressure was again adjusted, and the tires were made to run for 200 hours at a speed of 80 km/h on a drum with a load (20.24 kN). Then, generation states of cracks and chipped rubbers in the protect rib were visually observed and the tires were evaluated in a comprehensive manner. The evaluations are indicated in the following manner:

"○": a crack is not generated or a depth of a generated crack is 0.5 mm or less;

"Δ": a depth of a generated crack is more than 0.5 mm and 2.0 mm or less;

"×": a depth of a generated crack is more than 2.0 mm.

(3) Tire Mass:

A mass per one tire was measured.

TABLE 1

| | Comparative example 1 | Example 1 | Comparative example 2 | Example 2 | Example 3 | Example 4 | Example 5 |
|---|---|---|---|---|---|---|---|
| Protect rib | Circumferential direction | Radial direction | Radial direction | Radial direction | Radial direction | Radial direction | Radial direction |
| Number of formations | 1 | 27 | 27 | 27 | 27 | 27 | 27 |
| Angle α (°) | — | 7.5 | 7.5 | 7.5 | 7.5 | 7.5 | 7.5 |
| Rib shape | — (FIG. 9) | Triangular pyramid body (FIG. 4) | Triangular pyramid body (FIG. 4) | Triangular pyramid body (FIG. 4) | Triangular pyramid body (FIG. 4) | Triangular pyramid body (FIG. 4) | Triangular pyramid body (FIG. 4) |
| Vertical cross section shape K1 | — | Triangular shape | Triangular shape | Triangular shape | Triangular shape | Triangular shape | Triangular shape |
| Transverse cross section shape K2 | — | Triangular shape | Triangular shape | Triangular shape | Triangular shape | Triangular shape | Triangular shape |
| Maximum height HD1 (mm) | 5 | 5 | 5 | 5 | 5 | 5 | 5 |
| Distance Ha of outer end Ra (mm) | 153 | 153 | 121 | 125 | 166 | 153 | 153 |
| (Ha/HT) | 0.74 | 0.74 | 0.58 | 0.6 | 0.8 | 0.74 | 0.74 |
| Distance La of maxium height portion (mm) | 6.3 | 6.3 | 6.3 | 6.3 | 6.3 | 4.0 | 12.0 |
| (La/LR) | 0.16 | 0.16 | 0.16 | 0.16 | 0.16 | 0.1 | 0.3 |
| Distance Lb of inner end Rb (mm) | +8 | +8 | +8 | +8 | +8 | +8 | +8 |
| Rib width Wr | — | Gradually reducing | Gradually reducing | Gradually reducing | Gradually reducing | Gradually reducing | Gradually reducing |
| Critical line (*1) | ○ | ○ | ○ | ○ | ○ | ○ | ○ |
| Cut resistance | ○ | ○ | × | Δ | ○ | ○ | Δ |
| Riding comfort | 4 | 7 | 7 | 7 | 7 | 7 | 7 |
| Steering stability | 7 | 7 | 7 | 7 | 6 | 7 | 7 |
| Crack resistance | ○ | ○ | ○ | ○ | ○ | Δ | ○ |
| Tire mass | 39.5 | 37.5 | 37.5 | 37.5 | 37.5 | 37.5 | 37.5 |

| | Example 6 | Example 7 | Example 8 | Example 9 | Example 10 | Example 11 | Comparative example 3 |
|---|---|---|---|---|---|---|---|
| Protect rib | Radial direction | Radial direction | Radial direction | Radial direction | Radial direction | Radial direction | Radial direction |
| Number of formations | 27 | 27 | 27 | 27 | 27 | 27 | 27 |
| Angle α (°) | 7.5 | 7.5 | 7.5 | 7.5 | 7.5 | 7.5 | 7.5 |
| Rib shape | Truncated triangular pyramid body (FIG. 6A) | — (FIG. 6B) | — (FIG. 6B) | Triangular pyramid body (FIG. 4) | Triangular pyramid body (FIG. 4) | Triangular pyramid body (FIG. 4) | Triangular prismatic body — |
| Vertical cross section shape K1 | Triangular shape | Triangular shape | Triangular shape | Triangular shape | Triangular shape | Triangular shape | Rectangular shape |
| Transverse cross section | Trape- | Semicircular | Rectangular | Triangular | Triangular | Triangular | Triangular |

TABLE 1-continued

| shape K2 | zoidal shape | shape | shape | shape | shape | shape | shape |
|---|---|---|---|---|---|---|---|
| Maximum height HD1 (mm) | 5 | 5 | 5 | 5 | 5 | 5 | 5 |
| Distance Ha of outer end Ra (mm) | 153 | 153 | 153 | 153 | 153 | 153 | 153 |
| (Ha/HT) | 0.74 | 0.74 | 0.74 | 0.74 | 0.74 | 0.74 | 0.74 |
| Distance La of maxium height portion (mm) | 12.0 | 12.0 | 12.0 | 10.0 | 6.3 | 6.3 | 6.3 |
| (La/LR) | 0.16 | 0.16 | 0.16 | 0.16 | 0.16 | 0.16 | 0.16 |
| Distance Lb of inner end Rb (mm) | +8 | +8 | +8 | −8 | +8 | +8 | +8 |
| Rib width Wr | Gradually reducing | Gradually reducing | Gradually reducing | Gradually reducing | Gradually reducing | Constant | Gradually reducing |
| Critical line (*1) | ○ | ○ | ○ | ○ | x | ○ | ○ |
| Cut resistance | ○ | ○ | ○ | ○ | ○ | ○ | ○ |
| Riding comfort | 7 | 7 | 7 | 6 | 7 | 7 | 6 |
| Steering stability | 7 | 7 | 7 | 7 | 7 | 7 | 7 |
| Crack resistance | ○ | ○ | ○ | ○ | x | ○ | ○ |
| Tire mass | 38.0 | 38.2 | 38.5 | 38.0 | 37.5 | 38.0 | 38.2 |

(*1): x means that critical line between tread rubber and sidewall rubber passes through protect rib, and ○ means that critical line does not pass through protect rib.

As shown in Table 1, from the tires of the examples, it is possible to confirm that necessary cut resistance is secured, weight of the tire is reduced, and the riding comfort is enhanced.

| Reference signs List | |
|---|---|
| 1 | Pneumatic tire |
| 2 | Tread portion |
| 2G | Tread rubber |
| 3 | sidewall portion |
| 3G | sidewall rubber |
| 4 | Bead portion |
| 10 | Protect rib |
| 11 | Maximum height portion |
| 12 | Outer end-side inclined portion |
| 13 | Inner end-side inclined portion |
| 15 | Buffer rib |
| BL | Bead base line |
| J | critical line |
| Jp | Exposure position |
| K1 | Vertical cross section shape |
| Pm | Tire maximum width point |
| YU | upper sidewall region |
| Wr | Rib width |

What is claimed is:

1. A pneumatic tire comprising a tread portion, a pair of sidewall portions extending inward in a radial direction of the tire from both ends of the tread portion in an axial direction of the tire, and bead portions disposed on tire-radial inner ends of the sidewall portions, wherein
a plurality of protect ribs extending from a side of the tread portion in a length direction at an angle α of 0 to 20° with respect to a tire radial direction line and being disposed at distances from one another in a circumferential direction of the tire, are provided on an upper sidewall region which is in an outer surface S of each of the sidewall portions and outward of a tire maximum width point in the radial direction of the tire,
each of the protect ribs includes a maximum height portion whose height from the outer surface S is maximum, a vertical cross section shape of the protect rib which is parallel to the length direction passing through the maximum height portion is of substantially triangular shape, the substantially triangular shape includes an outer end-side inclined portion having the height which is gradually reduced from the maximum height portion to a radial outer end Ra of the protect rib, and an inner end-side inclined portion having the height which is gradually reduced from the maximum height portion to a radial inner end Rb of the protect rib,
a distance La between the maximum height portion and the radial outer end Ra in the length direction is in a range of 0.1 to 0.3 times of a distance LR in the length direction between the radial outer end Ra and the inner end Rb of the protect rib, and a tire radial distance Ha between the radial outer end Ra of the protect rib and a bead base line is in a range of 0.6 to 0.8 times of a tire cross section height HT, and
the protect ribs comprise triangular pyramid bodies or truncated triangular pyramid bodies.

2. The pneumatic tire according to claim 1, wherein a rib width of the protect rib which is perpendicular to the length direction is gradually reduced from the radial outer end Ra toward the radial inner end Rb.

3. The pneumatic tire according to claim 1, wherein a width of a traverse cross section of the protect rib which is perpendicular to the length direction is gradually reduced as being separated from the outer surface S.

4. The pneumatic tire according to claim 1, wherein the protect rib does not project outward of the tire beyond a radial direction line which passes through the tire maximum width point.

5. The pneumatic tire according to claim 1, wherein the tread rubber and the sidewall rubber come into contact with each other at a critical line, the critical line is exposed on the outer surface S in an exposure position, and the protect rib is disposed inward of the exposure position in the radial direction of the tire.

6. The pneumatic tire according to claim 1, wherein a buffer rib is provided radially outward of the protect rib such that the buffer rib is adjacent to the protect rib and the buffer rib projects at small height from the outer surface S and continuously extend in the circumferential direction of the tire.

7. The pneumatic tire according to claim 2, wherein a width of a traverse cross section of the protect rib which is perpendicular to the length direction is gradually reduced as being separated from the outer surface S.

* * * * *